United States Patent
Ismailov et al.

(10) Patent No.: US 6,456,603 B1
(45) Date of Patent: Sep. 24, 2002

(54) METHOD OF SUPPORTING COMMUNICATIONS MOBILITY IN A TELECOMMUNICATIONS SYSTEM

(75) Inventors: Yuri Ismailov, Spånga; Tomas Larsson, Johanneshov, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/235,030

(22) Filed: Jan. 21, 1999

(51) Int. Cl.[7] .................................................. H04J 7/00
(52) U.S. Cl. ........................ 370/310; 370/313; 370/352; 370/469
(58) Field of Search ................................ 370/310, 313, 370/349, 352, 389, 469

(56) References Cited

U.S. PATENT DOCUMENTS

| | | | | |
|---|---|---|---|---|
| 5,165,020 A | * | 11/1992 | Sudama et al. | 709/217 |
| 5,566,225 A | | 10/1996 | Haas | 379/58 |
| 6,266,405 B1 | * | 7/2001 | Madour et al. | 370/355 |
| 6,292,836 B1 | * | 9/2001 | Teraoka | 709/236 |
| 6,330,586 B1 | * | 12/2001 | Yates et al. | 709/201 |

FOREIGN PATENT DOCUMENTS

| | | |
|---|---|---|
| EP | 102492 | 9/1999 |
| WO | WO 97/30554 | 8/1997 |

OTHER PUBLICATIONS

XP–002113581 "TCP–R: TCP Mobility Support for Continuous Operation"; Daichi Funato et al.; Graduate School of Media and Governance, Faculty of Environmental Information, Keio University, Japan.

* cited by examiner

Primary Examiner—Hassan Kizou
Assistant Examiner—Tim Spafford
(74) Attorney, Agent, or Firm—Jenkens & Gilchrist, P.C.

(57) ABSTRACT

A multilevel session management protocol is provided to support communications mobility in a telecommunications system. A session is separated into two independent layers—a terminal session layer and an application session layer. A session management agent is implemented as a module operating locally in a wireless terminal. A second session management agent is implemented as a module operating remotely in the Internet. Any session management agent module can communicate with another session management agent module by use of the session management protocol. The two session management agent modules use a multiplexed TCP connection for conveying TCP data traffic therebetween. As such, the session management protocol can be used with any application that uses an Internet TCP as a transport protocol.

21 Claims, 2 Drawing Sheets

METHOD OF SUPPORTING COMMUNICATIONS MOBILITY IN A TELECOMMUNICATIONS SYSTEM

BACKGROUND OF THE INVENTION

1. Technical Field of the Invention

The present invention relates generally to the telecommunications field and, in particular, to a method and architecture for supporting communications mobility in a telecommunications system.

2. Description of Related Art

Ever since the beginning of the 1990s, the demand for increased mobility in the computing and communications fields has grown substantially. However, despite the increased mobility that has developed in these fields as a result of the heightened demand, the users of these technologies have all the while insisted on being able to maintain their Internet connectivity because of the massive amount of information that has been made available and the myriad of communications services that can be accommodated on the Internet. As such, mobility in Internet Protocol (IP) networks has become one of the hottest development areas with respect to the ability of providing a continuous flow of data from and to mobile terminals.

With the advent of the next (so-called "third") generation mobile communications systems, two additional requirements are being imposed on mobile terminal designs. The first such requirement is for a mobile terminal to be capable of communicating over a number of different wireless interfaces. The second requirement is for the mobile terminal to be capable of automatically changing a communications interface in order to adapt to the available network, or in accordance with a network's characteristics if multiple networks are involved. The latter (multiple network) capability leads to the need for a terminal that can change its Internet identification (e.g., IP address) when the terminal has changed the type of Internet access network being used or the Internet Service Provider (ISP) offering such access. On the one hand, just having the opportunity to use multiple network interfaces to access the Internet is a significant advantage. However, on the other hand, it becomes more difficult to provide a continuous data flow for highly mobile terminals which are capable of changing their Internet identifications, while maintaining their ongoing connections to the Internet servers.

Support for such communications mobility can be provided in two different ways which depend on the underlying communication infrastructure. One method for supporting mobility is designed for users with fixed connections or local wireless connections to the Internet via Local Area Networks (LANs). This approach allows a user to maintain its identity (IP address), ongoing connections, etc., while physically changing the points of attachment to another LAN. This form of mobility frequently provides support for "Decoupled Computing," as described in "Adaptation and Mobility in Wireless Information Systems," by Randy H. Katz, IEEE Personal Communications, First Quarter 1994. The term "decoupled computing" is defined as the ability to compute while being detached from the existing computing and communication infrastructure. This capability can be achieved by using file caching techniques on local devices. Subsequently, when a device is again attached to some communication environment, the changed files can be automatically synchronized with copies maintained on a file server. This technique of "decoupled computing" is important because it provides a capability for continuing the computing process locally during movement between communication environments where users spend most of their time (e.g., home, office, corporate or university campus, etc.).

A number of proposals have been made to support this type of mobility. However, the basic assumption made in all of these proposals is that a mobile station has a fixed IP address regardless of its point of attachment. This assumption implies that the IP address must be unique within the public Internet address space in order to allow the mobile station to connect to an arbitrary IP network.

Another type of mobility service exploits certain opportunities offered by wide area wireless networks. This type of service is intended for users who require access to information and other resources while being physically located away from LAN infrastructures. For example, the basic ideas concerning the provision of continuous network connectivity in a wide area wireless environment are described in "The Design of a Platform for Mobile Data Communication," by Peter Peinl and Christoph Kroll, First IEEE Symposium on Global Data Networking, Cairo, Dec. 12–15, 1993. Essentially, information about this type of service has not been widely published because mobility can be readily supported by wide area wireless networks, as long as the user is located in the coverage area of the same Internet Service Provider (ISP) or does not change the network type. In this case, the existing solutions can provide continuous data flow regardless of a change in the geographical position of the user's terminal.

A significant problem arises if a terminal, for some reason, needs to change its IP identification (i.e., IP address) while maintaining an ongoing communication session with an Internet host. In this case, changing the terminal's IP address makes it impossible for the terminal to resume communication at the point where the communication was interrupted. As such, all active sessions have to be started over from the very beginning. Consequently, the process of starting the communication sessions over can be extremely burdensome especially for the terminals connected to the Internet through low capacity, wide area wireless networks.

The main reason for changing an IP address is related to the strategy used for allocating IP addresses for Internet hosts. First, an IP address can be public or private. A public IP address is the address which is unique among all Internet hosts having direct access to the Internet. A private IP address is the address that can replicate any public IP address but is not "visible" on the global Internet. In other words, this address exists within some LAN or Intranet and is substituted for by some other, public IP address when communicating with the hosts within the global Internet.

Second, an IP address can be dynamic or static. A dynamic IP address is the address that is allocated from the common pool of IP addresses at an ISP. The first available address in the pool is selected. This means that every time a host (e.g., server) wishes to be connected to the Internet, the host will receive an IP address from the ISP's pool, which means that the IP address can be different from time to time.

A static IP address is the address which is associated with a terminal during the lifetime of a subscription at some ISP. This address is closely related to the communication interface of some particular access network. Additionally, both public and private IP addresses can also be static and dynamic. In summary, the basic problem is that an IP address is not always associated with a particular terminal, and the IP address needs to be changed if the terminal changes an access network type and/or its ISP.

Traditionally, the communications between Internet hosts include certain end-to-end semantics. These functions are provided by the known Transport Control Protocol (TCP). The end-to-end channel between communicating peers is defined by two socket pairs: a local host socket pair and a remote host socket pair. Each socket pair comprises two components—an IP address (local or remote) and TCP port number (local or remote). A change made to any of these components (or to them both) leads to a need to establish a new end-to-end communication channel, although physically the same hosts are involved in the communication. According to the existing semantics for communications between two Internet hosts using the TCP, it is not possible to map a previous TCP connection to a new connection, if one or more components of the socket pair has been changed.

Ultimately, the above-described problem can be summarized as follows. If a fixed or mobile terminal changes its IP address while it is engaged in ongoing communication sessions with Internet hosts, these sessions cannot be resumed at the point of interruption. Instead, these sessions have to be restarted at the very beginning. Consequently, a user has too be connected for a much longer period than usual in order to obtain a desired result, and the resulting communication session becomes much more expensive.

The solutions that exist for gaining IP mobility do not cope with the above-described types of problems for two reasons. First, the existing solutions assume that the mobile host will not change its IP address during a communication session. Second, the existing solutions assume that support for continuous data flow to/from a mobile terminal can be accomplished by establishing new routes to the terminal on the network layer (i.e., the IP layer residing below the TCP in the communications protocol stack).

In this regard, the session layer protocol is a known protocol that provides at least one solution to the above-described communications mobility problem. For example, the International Standards Organization (ISO) has set forth a number of data communications standards, including the Open Systems Interconnection (OSI) model. The OSI model is used to define the functions of various levels within a protocol stack. Under the OSI model, the session layer (layer 5) resides just over the transport protocol (layer 4) in the communications protocol stack. As such, the primary tasks of the session layer are as follows: establishment and maintenance of sessions; management of dialogs; and session recovery. These features provide for the resumption of communication sessions that have been interrupted for any reason by the underlying protocols. However, although these features result in a notion of session independence for end-to-end semantics in data communications over the Internet, they still depend on the use of the IP addresses of communicating peers. As such, the existing solution assumes that the IP addresses for the dialog at the resumed session are the same as they were for both the client and server before the session was interrupted.

Another existing solution to the communication mobility problem uses the concept of multiplexed TCP connections. This concept was first described in "WebExpress: A System for Optimizing Web Browsing in a Wireless Environment," by Barron C. Housel and David B. Lindquist, ACM/IEEE MobiCom'96 Conference, 1996. The primary goal of this concept is to speed up the operation of Web browsing for users of low capacity wireless links for Internet access. All TCP connections issued by a wireless terminal are multiplexed into one TCP connection, which is established between a Client Side Intercept (CSI) module and a Server Side Intercept (SSI) module. The CSI module resides locally in the wireless terminal and functions as a local "http" proxy for a Web browser. The SSI module resides in the Internet (wired part of the network) and functions as another "http" proxy that directly communicates with the original server. The multiplexed TCP connection is thus implemented, along with some other enhancements designed to reduce the amount of information that passes between the CSI and SSI modules. Nevertheless, the multiplexed TCP connection solution does not account for the case where a mobile terminal changes its IP address during the period when a session has been interrupted and thus cannot be resumed successfully at the point of interruption. Consequently, a need exists for a protocol and method that will support such communications mobility. As described in detail below, the present invention successfully meets this need and resolves the above-described problems.

SUMMARY OF THE INVENTION

In accordance with a preferred embodiment of the present invention, a multilevel Session Management Protocol (SMP) is provided to support communications mobility in a telecommunications system. A communications session is separated into two independent layers—a terminal session layer and an application session layer. For this exemplary embodiment, a Session Management Agent (SMA) is implemented as a module operating locally in a wireless terminal. A second SMA is implemented as a module operating remotely in the Internet. Any SMA module can communicate with another SMA module by use of the SMP. The two SMA modules use a multiplexed TCP connection for conveying TCP data traffic therebetween. As such, the SMP can be used with any application that uses an Internet TCP as a transport protocol. Of course, it is within the scope of the present invention to use other IP-based protocols, with changes in the SMP in accordance with the properties of these protocols.

An important technical advantage of the present invention is that a mobile client's communications session can be interrupted and resumed successfully and independently of a network's current configuration, access network used, and the client's current IP address.

Another important technical advantage of the present invention is that a change in a network configuration and/or a client's IP address can take place during a transfer of data and subsequently the data missing due to the interruption will be recovered.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, in accordance with a preferred embodiment of the present invention, a multilevel SMP is provided to support communications mobility in a telecommunications system. A communications session is separated into two independent layers—a terminal session layer and an application session layer. A session management agent is implemented as an SMA module operating locally in a wireless terminal. A second session management agent is implemented as an SMA module operating remotely in the Internet. Any SMA module can communicate with another SMA module by use of the SMP. The two SMA modules use a multiplexed TCP connection for conveying TCP data traffic therebetween. As such, the SMP can be used with any application that uses an Internet TCP as a transport protocol, although some legacy applications may require some adjustment for this purpose.

Figure 1:
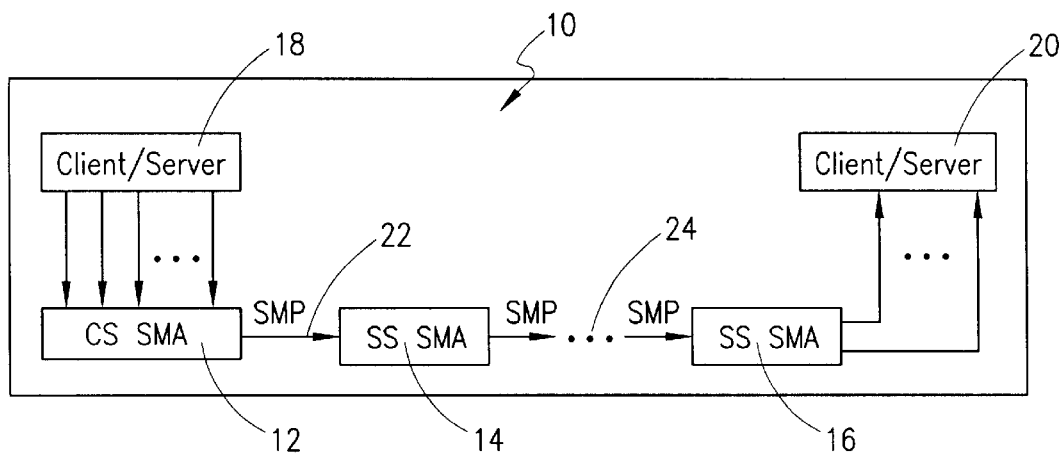
FIG. 1 is a block diagram of a communications architecture that can be used to implement a preferred embodiment of the present invention.

Specifically, FIG. 1 is a block diagram of a communications architecture 10 that can be used to implement a preferred embodiment of the present invention. A first SMA can be implemented as a module operating locally in a wireless terminal. A second SMA can be implemented as a module operating remotely somewhere in the Internet. For this embodiment, a local SMA is referred to as a Client-Side SMA (CS SMA) (e.g., 12), and all other SMAs in the network are referred to as Server-Side SMAs (SS SMAs) (e.g., 14, 16). Notably, there is no restriction placed on the number of SMAs that can be implemented between the local SMA (e.g., CS SMA 12) and an original server (e.g., client/server 20). For this embodiment, a communications session is to be conducted between two clients' mobile terminals via a respective server 18, 20.

In accordance with the preferred embodiment, any pair of SMA modules can communicate with each other by use of the SMP. Also, any pair of SMA modules can use a multiplexed TCP connection (e.g., 22, 24) to send TCP data traffic to one another. In that regard, any SMA module can accept an arbitrary number of clients (i.e., multiplexed TCP connections) to facilitate communications therebetween.

Figure 2:
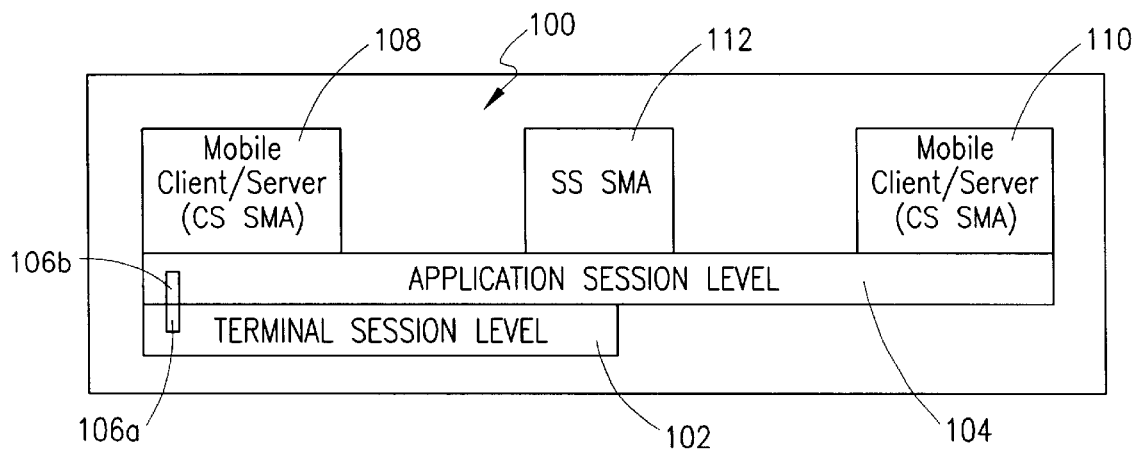
FIG. 2 is a block diagram of a multilevel session architecture and protocol that can be used to implement the preferred embodiment of the present invention.

FIG. 2 is a block diagram of a multilevel session architecture and protocol 100 that can be used to implement the preferred embodiment of the present invention. The multilevel session architecture and protocol 100 includes a Terminal Session (TS) level 102 and an Application Session (AS) level 104. Both session levels 102 and 104 preferably function independently from one another, except for a Session Identifier (Sid) 106 which can be envisioned to span vertically across the TS and AS levels. The Sid 106 is used for mapping of active sessions, and also for retrieving sessions that have to be resumed, for example, after a TS has been reinitialized. The structure of such an Sid is described in detail below.

In accordance with the preferred embodiment, by separating a communications session into the two levels shown, the AS 104 will be unaware of the network's status, and therefore, the AS 104 will not have to be interrupted even if the network is unreachable. Moreover, the AS 104 can function independently of the IP address of the terminal involved, because the AS establishes only local (e.g., within the same terminal) communications to a CS SMA (e.g., 108 or 110). The TS 102 handles the network connection using access networks, and depending on the communication scenario employed, the TS can use different IP addresses. Notably, as a consequence of separating the AS and TS levels, a change made to an access network and/or an IP address during a communications session is transparent to the AS.

In accordance with the preferred embodiment, a mapping of a TS between a CS SMA (e.g., 108 or 110) and SS SMA (e.g., 112) is provided. However, because an SS SMA can accept an arbitrary number of clients (i.e., TSs), the mapping is preferably specified by a single parameter. For this purpose, a multiplexed TCP connection can be used between each client and the SS SMA. This approach serves to map each client to one TCP connection at the SS SMA.

For this embodiment, a Client Number (CN) is used to represent each client at the SS SMA 112. Preferably, a CN is a unique integer which is assigned to each client's single TCP connection. The CN forms the portion of the Sid (e.g., 106a) which belongs to the TS level 102. In order to be capable of resuming an AS (which has been interrupted for some reason), the SMP uses a second portion of the Sid (e.g., 106b) which belongs to the AS level 104. As such, the portion of the Sid (106b) that belongs to the AS level preferably comprises three components.

The first component of the AS level-related portion of the Sid is a TCP Connection Number (TCPN). This component is a unique integer value assigned by a CS SMA (108 or 110) to any new TCP connection established between an application and that CS SMA. A requirement imposed for this value is that it must be a unique value within the mobile terminal that is operating that CS SMA. Consequently, an SS SMA can identify any AS by the pair {CN, TCPN}. The second component of the AS level-related portion of the Sid is the Previous IP Address (PIP). This component is stored by a CS SMA any time a mobile terminal changes its IP address. The third component is the Current IP Address (CIP). This component of the AS level-related portion of the Sid is equal to the current IP address used by the mobile terminal involved in the session.

Figure 3A:
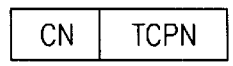
FIGS. 3A and 3B are related diagrams that illustrate how a Sid can be used to establish, terminate or resume a communication session, in accordance with the preferred embodiment of the present invention.
Figure 3B:
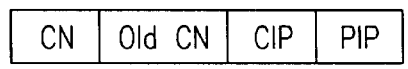

FIGS. 3A and 3B are related diagrams that illustrate how a Sid can be used to establish, terminate or resume a communication session, in accordance with the preferred embodiment of the present invention. As such, a fixed or mobile terminal's communication session can be established in response to a user's request via, for example, a graphical user interface or automatically, if a session is to be resumed. Referring to the exemplary Sid format shown in FIG. 3A, establishing a terminal session means the establishment of the multiplexed TCP connection between the CS SMA and an SS SMA. During the establishment of a session, the CS SMA and SS SMA involved exchange tokens with the SMP, and pass necessary information to each other about session parameters (i.e., the CS SMA and SS SMA create a Sid for the session being established).

When the involved SS SMA receives an announcement about a newly-initiated session with a new client, the SS SMA allocates the unique integer (CN) among all clients attached to it, and returns that CN back to the new client. The new client is required to maintain this number. The client can use this number only to pass the CN to the SS SMA, in order to identify the client if necessary. During a handshake procedure, if the terminal session being established is a new session, the CS SMA sends its CIP to the SS SMA involved.

Whenever an application establishes a new local TCP connection to the CS SMA, the CS SMA allocates a unique integer (TCPN) for this connection, which has to be unique only within a mobile terminal.

During an active terminal session, the CS SMA sends the CN and TCPN to the SS SMA (in the SMP header), in order to correctly identify the TCP connections between the SS SMA and Internet server that SS SMA is communicating with. In order to terminate a communication session under normal circumstances (e.g., the CS SMA informs the SS SMA that the session will be terminated), no particular procedure using a Sid is required.

Referring to the exemplary Sid format shown in FIG. 3B, in the case of the resumption of an abnormally interrupted communication session, the CS SMA first establishes a multiplexed connection in the same manner as described above for the establishment of a session. The CS SMA then obtains a new CN. At this point, the involved SS SMA does not know if a new session is being established or a previously-interrupted session is being resumed. The CS SMA sends a special SMP token (message) to the SS SMA which specifies that the session is being resumed. Additionally, the SMP token sent by the CS SMA includes the CS SMA's new CN, CIP and PIP, along with the old CN used in the previous terminal session. The old CN is required for the SS SMA in order to map over the corresponding TCP connections to the Internet server(s) according to the new Sid created for the session's resumption. As soon as all of the clients' connection have been updated with the new Sid, the application sessions can continue from the point where they were interrupted. These functions can be achieved by the use of session protocol capabilities, which negotiate the last correctly-received portion of data, and provides both the CS SMA and SS SMA with information necessary to continue sending and receiving data correctly in both directions.

Figure 4:
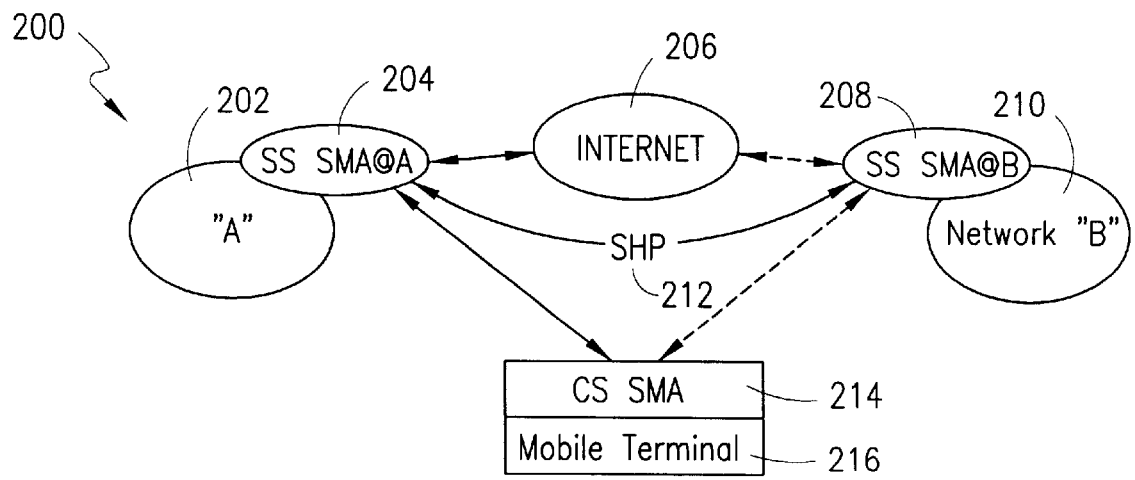
FIG. 4 is a diagram of a system that can be used to implement a second exemplary embodiment of the present invention.

FIG. 4 is a diagram of a system 200 that can be used to implement a second exemplary embodiment of the present invention. In this embodiment, for the session management system's architecture and the format or structure of the Sid involved, it can be assumed that in order to resume an application session, a mobile terminal has to reestablish an interrupted terminal session with the same SS SMA. Although the system 200 can function properly after reestablishing the terminal session, the system may route unnecessary data traffic through that SS SMA.

For example (assuming the following scenario), a mobile terminal 216 initiates a new terminal session with an SS SMA 204 residing in the access network "A" 202. An ongoing session is interrupted for some reason (e.g., network "A" 202 becomes unavailable). The mobile terminal 216 reconnects to the Internet 206 using, for example, a different access network "B" 210. If the mobile terminal 216 is to use the same SS SMA as before the interruption (e.g., 204), the routing has to include the additional leg from network "B" 210 to network "A" 202.

For this embodiment, it can be assumed that network "B" 210 also offers the session management services that are available to the mobile terminal 216. In this case, the mobile terminal 216 can connect and thus establish the new terminal session with the SS SMA 208 residing in the network "B" 210. As such, the described system (200) does not have the functionality to resume suspended application sessions at the mobile terminal 216, because the system's knowledge about these sessions' states on the network side is left to the SS SMA 204 residing in the network "A" 202. Consequently, in accordance with this embodiment, in order to avoid additional routing and still be capable of retrieving and resuming suspended application sessions, the exemplary system (200) can be extended with the use of a Session Handover Protocol (SHP) 212. Also, the application part of the Sid can be extended with the use of the Previous SS SMA IP address (PSMAIP), which can be used to retrieve the identity of the SS SMA (e.g., 204) that was serving the mobile terminal 216 before the session's interruption. This extension is necessary, for example, if the mobile terminal 216 establishes the terminal session with a different SSMA (e.g., 208), while having suspended application sessions supported by the previously-served SS SMA (e.g., 204).

Figure 5:
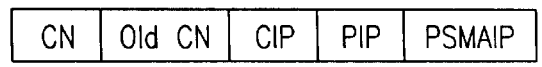
FIG. 5 is a format for a Sid that can be used for supporting a session handover, in accordance with the second exemplary embodiment of the present invention.

FIG. 5 is a format for a Sid that can be used for supporting a session handover, in accordance with the second exemplary embodiment of the present invention. Essentially, referring to FIGS. 4 and 5, the CS SMA 214 in system 200 is capable of retrieving and resuming application sessions held between the CS SMA 214 and the SS SMA 204 via the access network "A" 202, even if the subsequent terminal session is established with the SS SMA 208 residing in the network "B" 210. The data for the new application sessions pass directly through the SS SMA@B 208 and then on to the Internet 206 server(s). Only old sessions may require an additional routing path between the SS SMA@B 210 and SS SMA@A 204.

In accordance with the second embodiment, the session handover method can be implemented as follows. First, the CS SMA 214 establishes a terminal session with some SS SMA (e.g., 204). If any application sessions are in a suspended state (i.e., awaiting resumption), the CS SMA 214 compares the PIP of the SS SMA (204) involved and the PSMAIP. If these two IP addresses are the same, the session can be resumed as described above (no handover required). However, if the CS SMA 214 connects to a different SS SMA (e.g., 208), the CS SMA sends a special resume token to that SS SMA with the Sid containing the PSMAIP. In response, the SS SMA (208) establishes contact (using the SHP 212) with the SS SMA (204) pointed to by the PSMAIP. Subsequently, the present SS SMA 208 acts on behalf of the CS SMA 214 with respect to the previous SS SMA 204. As such, the present SS SMA 208 transparently passes SMP data units and data between the CS SMA 214 and the previous SS SMA 204. The previous SS SMA 204 processes data sent to it via the present SS SMA 208, as if the data had come directly from the CS SMA 214.

The Sid sent to the present SS SMA 208 for the handover procedure can have the format shown in FIG. 5. The present SS SMA 208 removes the PSMAIP field from the Sid and sends the session resumption request to the previous SS SMA 204. The format of such a Sid can be the same as the format shown in FIG. 3B. As such, the previous SS SMA 204 does not perceive any difference in the session resumption process through another SS SMA or directly from the CS SMA 214.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for use in improving communications mobility, comprising:

a first session management agent module, said first session management agent module coupled to a first communications terminal; and at least a second session management agent module, said first session management agent module coupled to said at least a second session management agent module and communicating therebetween in accordance with a session management protocol, wherein said session management protocol comprises a format for conducting a communications session between two session management agent modules, said communications session further comprising a terminal session level and an application session level.

2. The system of claim 1, wherein said first session management agent module comprises a client-side session management agent module located in said first communications terminal.

3. The system of claim 1, wherein said first session management agent module is coupled to said at least a second session management agent module by a multiplexed TCP connection.

4. The system of claim 1, wherein said at least a second session management agent module comprises a server-side session management agent module located in an Internet.

5. The system of claim 1, wherein said at least a second session management agent module includes a plurality of server-side session management agent modules.

6. The system of claim 1, wherein said application session level is coupled to said terminal session level by a session identifier and wherein said identifier comprises a first part associated with said terminal session level, and a second part associated with said application session level.

7. A communications session architecture for use in improving communications mobility, comprising:
an application session part, wherein said application session part comprises an application session level;
a terminal session part, wherein said terminal session part comprises a terminal session level; and
a session identifier, wherein said session identifier comprises a first part associated with said terminal session level, and a second part associated with said application session level, said session identifier coupling said application session part to said terminal session part.

8. The communications session architecture of claim 7, wherein a combination of said application session part and said terminal session part comprises said communications session.

9. The communications session architecture of claim 7, wherein said first part comprises a client number associated with a TCP connection for a mobile terminal, and said second part comprises at least one of a TCP connection number associated with said mobile terminal, a previous IP address associated with said mobile terminal, a current IP address associated with said mobile terminal, and an old client number associated with said mobile terminal.

10. The communications session architecture of claim 7, wherein said first part comprises a client number associated with a TCP connection for a mobile terminal, and said second part comprises at least an application session number associated with said mobile terminal.

11. The communications session architecture of claim 7, wherein said first part comprises a client number associated with a TCP connection for a mobile terminal, and said second part comprises at least one of a previous IP address associated with said mobile terminal, a current IP address associated with said mobile terminal, an old client number associated with said mobile terminal, and a previous server side session management agent IP address.

12. A system for use in improving communications mobility, comprising:

a first session management agent module, said first session management agent module coupled to a first communications terminal; and
at least a second session management agent module, said first session management agent module coupled to said at least a second session management agent module for conducting a communications session therebetween in accordance with a session management protocol, said communications session comprising a terminal session part and an application session part, a session identifier coupling said application session part to said terminal session part, wherein said session identifier comprises a first part associated with a terminal session level, and a second part associated with an application session level.

13. The system of claim 12, wherein said first part comprises a client number associated with a TCP connection for a terminal, and said second part comprises at least one of a TCP connection number associated with said terminal, a previous IP address associated with said terminal, a current IP address associated with said terminal, and an old client number associated with said terminal.

14. The system of claim 12, wherein said first part comprises a client number associated with a TCP connection for a terminal, and said second part comprises at least an application session number associated with said terminal.

15. The system of claim 12, wherein said first part comprises a client number associated with a TCP connection for a terminal, and said second part comprises at least one of a previous IP address associated with said terminal, a current IP address associated with said terminal, an old client number associated with said terminal, and a previous server side session management agent IP address.

16. A method for use in improving communications mobility, comprising the steps of:
conveying session data from a first terminal to a first session management agent module;
conveying said session data from said first session management agent module to a second session management agent module by a multiplexed TCP connection and in accordance with a session management protocol, wherein said session management protocol comprises a format for conducting a communications session between two session management agent modules said communications session further comprising a terminal session level and an application session level; and
conveying said session data from said second session management agent module to a second terminal.

17. The method of claim 16, wherein said first terminal comprises a wireless terminal and said second terminal comprises a terminal residing in an Internet.

18. The method of claim 16, wherein said first session management agent module comprises a client-side session management agent module located in a mobile communications terminal.

19. The method of claim 18, wherein said second session management agent module comprises a server-side session management agent module located in an Internet.

20. The method of claim 19, wherein said server-side session management agent module is operable to communicate with at least another server-side session management module over said multiplexed TCP connection and in accordance with said session management protocol.

21. The method of claim 16, wherein said application session level is coupled to said terminal session level by a session identifier and wherein said identifier comprises a first part associated with said terminal session level, and a second part associated with said application session level.

* * * * *